Dec. 18, 1951     O. BACHMANN     2,579,290
ENGRAVING MACHINE

Filed June 30, 1945     10 Sheets-Sheet 1

Inventor
Oscar Bachmann
by Singer, Ehlert, Stern & Carlberg
Attorneys

Dec. 18, 1951   O. BACHMANN   2,579,290
ENGRAVING MACHINE
Filed June 30, 1945   10 Sheets-Sheet 2
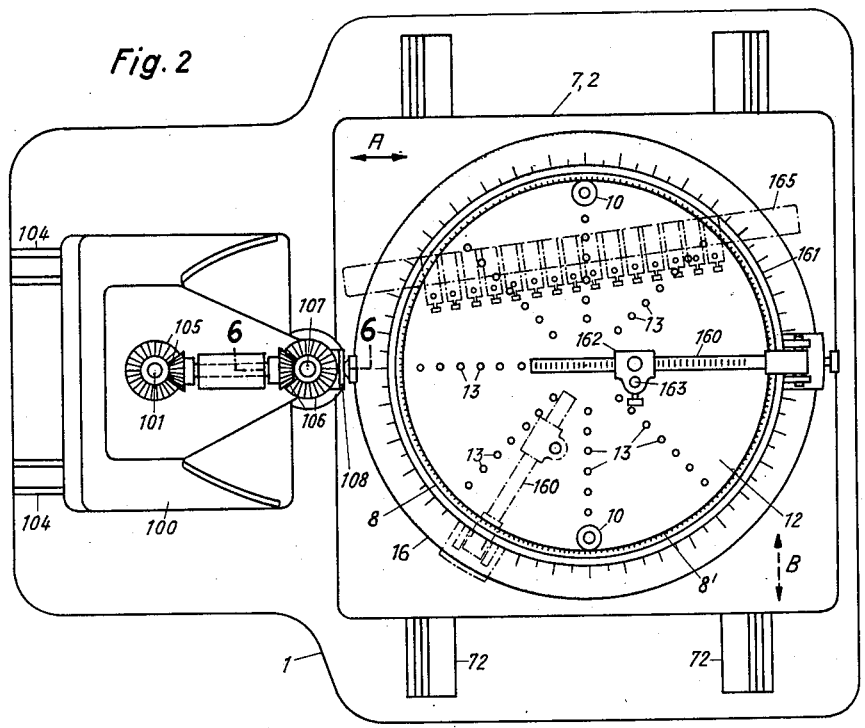
Fig. 2
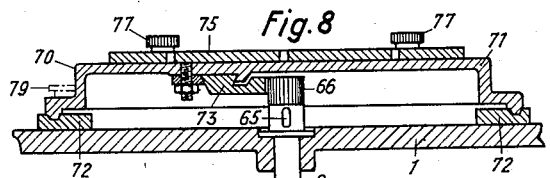
Fig. 8
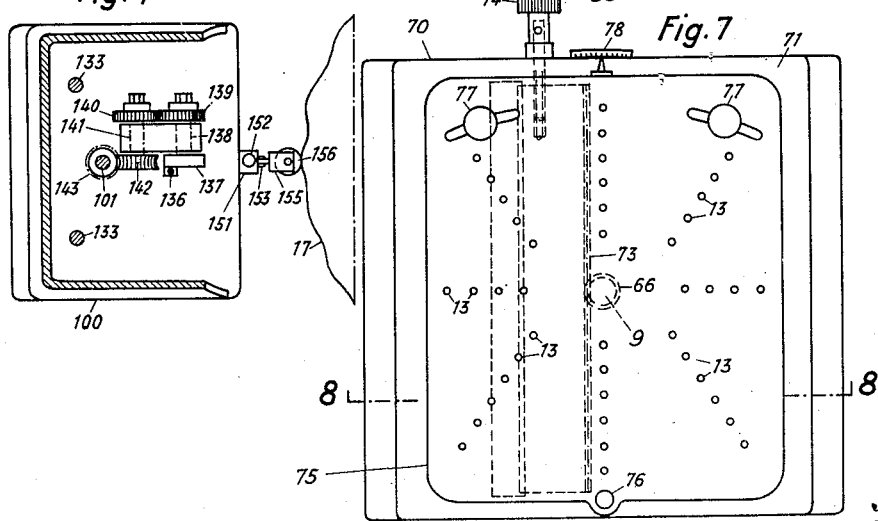
Fig. 4
Fig. 7
Inventor
Oscar Bachmann
by Singer, Ehlert, Stern & Carlberg
Attorneys Dec. 18, 1951  O. BACHMANN  2,579,290
ENGRAVING MACHINE
Filed June 30, 1945  10 Sheets-Sheet 3
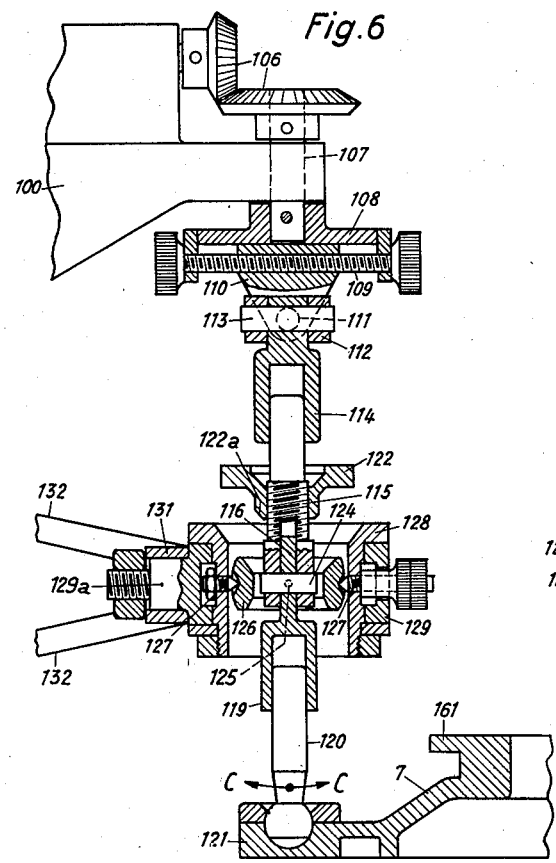
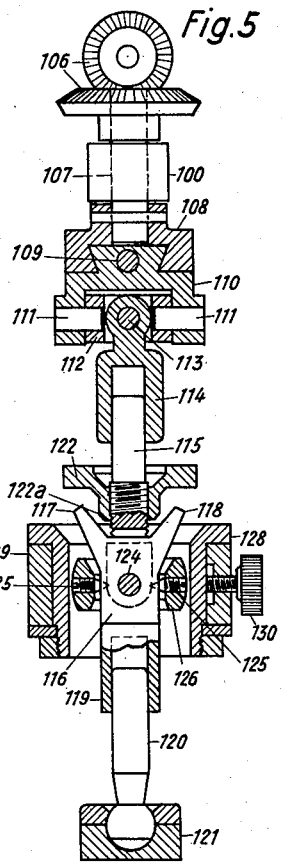
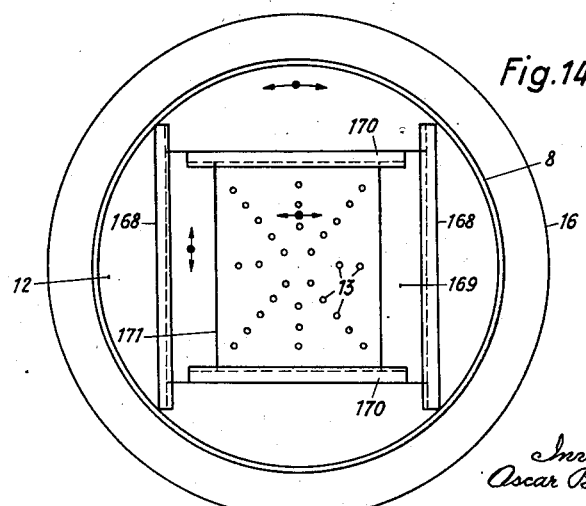
Inventor
Oscar Bachmann
by Singer, Ehlert, Stern & Carlberg
Attorneys Dec. 18, 1951     O. BACHMANN     2,579,290
ENGRAVING MACHINE
Filed June 30, 1945     10 Sheets-Sheet 4

Inventor
Oscar Bachmann
by Singer, Ehlert, Stern & Carlberg
Attorneys

Dec. 18, 1951     O. BACHMANN     2,579,290
ENGRAVING MACHINE

Filed June 30, 1945     10 Sheets-Sheet 5

Inventor
Oscar Bachmann
by Singer, Ehlert, Stern & Carlberg
Attorneys

Dec. 18, 1951     O. BACHMANN     2,579,290
ENGRAVING MACHINE
Filed June 30, 1945     10 Sheets-Sheet 6
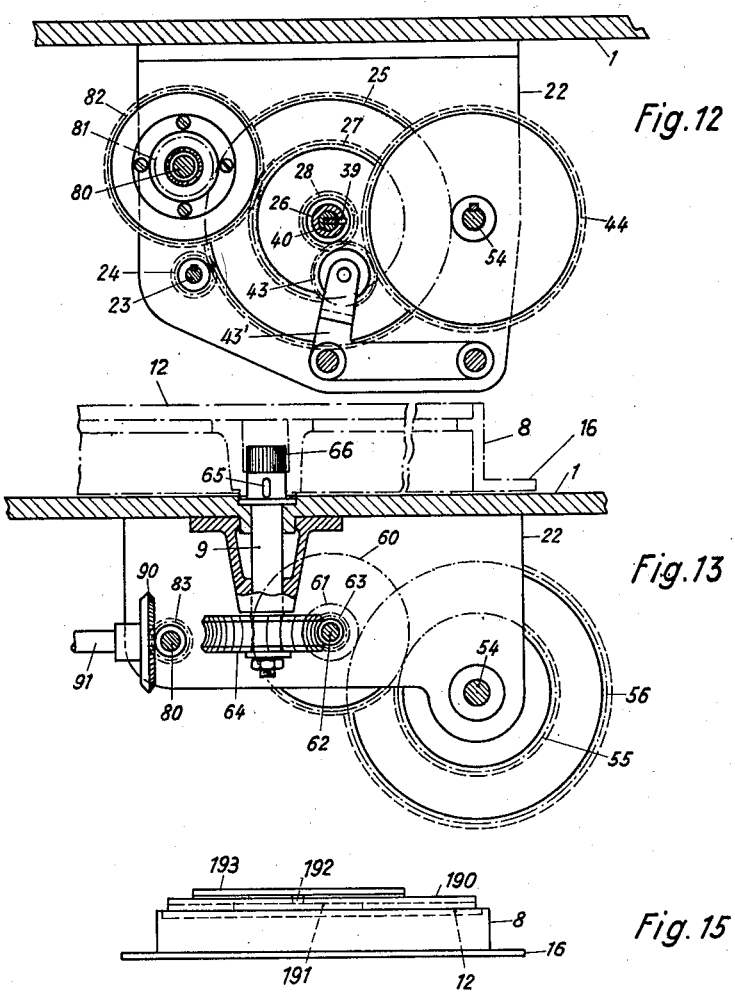

Dec. 18, 1951  O. BACHMANN  2,579,290
ENGRAVING MACHINE
Filed June 30, 1945  10 Sheets-Sheet 7

Inventor
Oscar Bachmann
by Singer, Ehlert, Stern & Carlberg
Attorneys

Dec. 18, 1951  O. BACHMANN  2,579,290
ENGRAVING MACHINE
Filed June 30, 1945  10 Sheets-Sheet 8

Inventor
Oscar Bachmann
by Singer, Ehlert, Stern & Carlberg
Attorneys

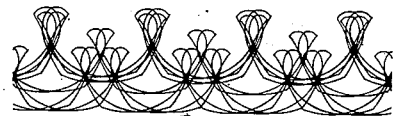
Fig. 40
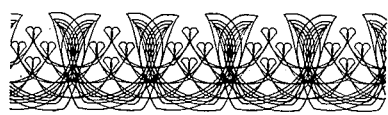
Fig. 41
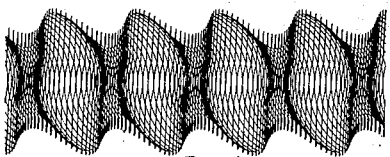
Fig. 42
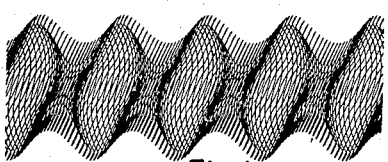
Fig. 43
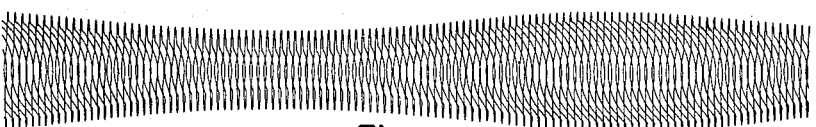
Fig. 44
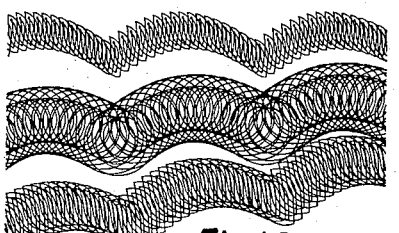
Fig. 45
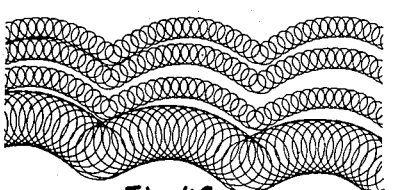
Fig. 46
Fig. 47
Fig. 49
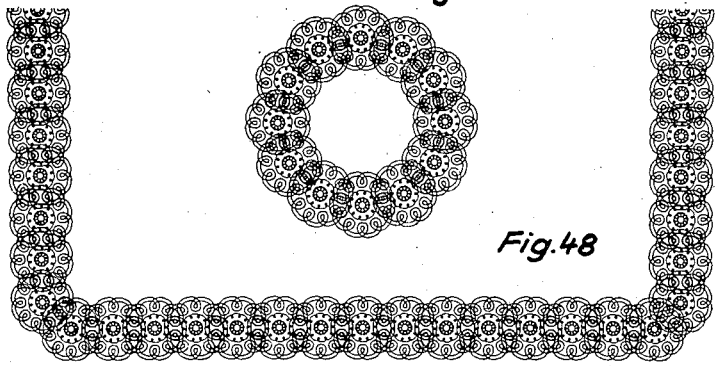
Fig. 48

Dec. 18, 1951  O. BACHMANN  2,579,290
ENGRAVING MACHINE
Filed June 30, 1945  10 Sheets-Sheet 10

Inventor
Oscar Bachmann
by Singer, Ehlert, Stern & Carlberg
Attorneys

Patented Dec. 18, 1951

2,579,290

UNITED STATES PATENT OFFICE 2,579,290

ENGRAVING MACHINE

Oscar Bachmann, Zurich, Switzerland

Application June 30, 1945, Serial No. 602,615
In Switzerland May 16, 1944

2 Claims. (Cl. 33—27)

The present invention relates to a new and improved engraving machine and especially to a device for the production of plates of metal, glass and so on bearing a pattern of fine lines which plates after etching are employed for printing the pattern on paper, for instance, to produce polychromatic impressions.

The machine comprises a table for a plate to receive the pattern to be reproduced and at least one engraving stylus, the said plate and said stylus being moved with reference to each other in such a manner, that a great variety of curves of a highly ornamental character may be produced.

The main object of the invention consists in the provision of means to produce at will at any position of any of the patterns produced distortions of the curves not easily to be detected and copied.

The invention is applicable for instance to the production of bank notes and the like documents.

In the accompanying drawings a machine is shown by way of an example in a diagrammatic manner.

Fig. 2 is a top view thereof.

Figs. 3 to 5 are sections respectively on the lines 3—3, 4—4 and 5—5 of Fig. 1 showing details of construction.

Fig. 6 is a section taken on the line 6—6 of Fig. 2.

Fig. 7 illustrates the table of the machine in top view.

Fig. 8 is a cross-section taken on line 8—8 of Fig. 7.

Figure 10:
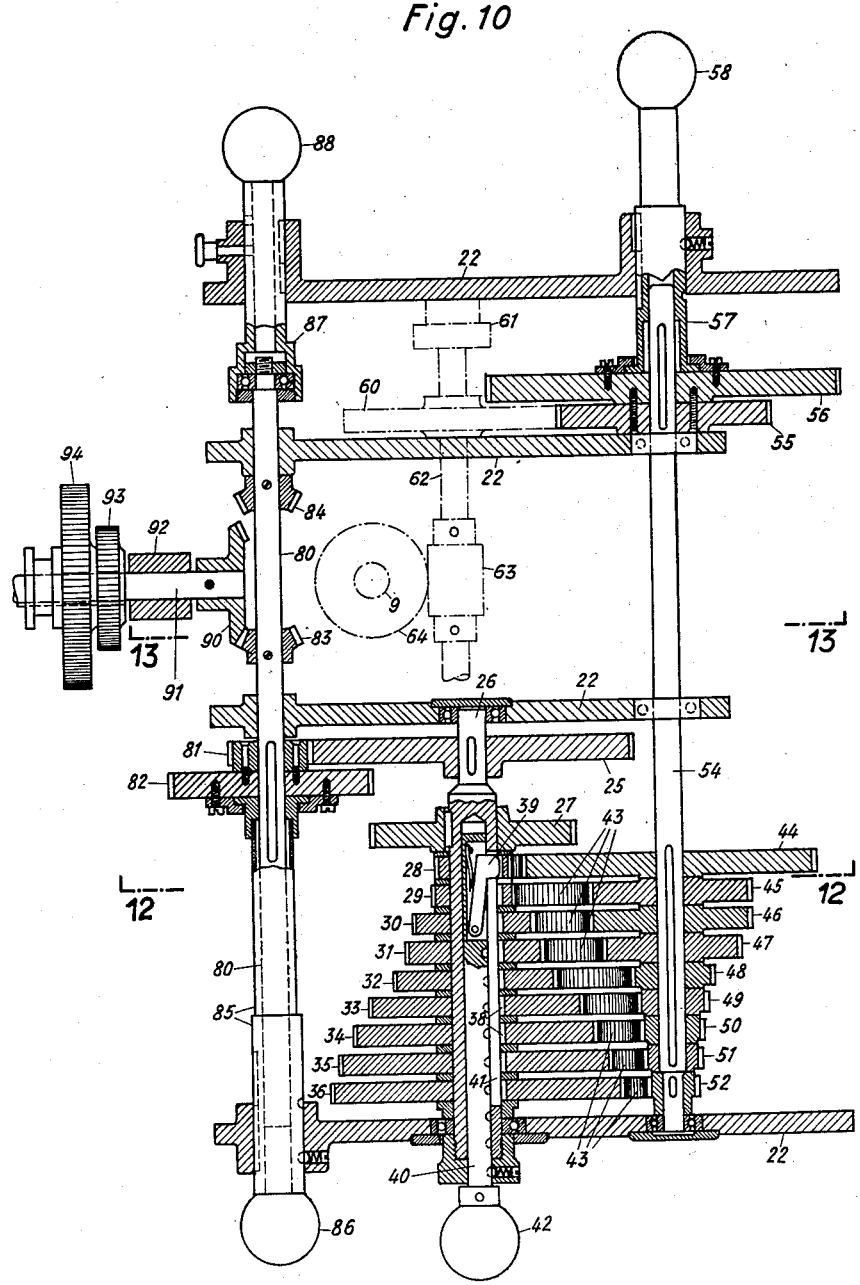

Figs. 12 and 13 are cross-sections taken on the lines 12—12 and 13—13 of Fig. 10.

Fig. 14 is a top view of a cross-support.

Figs. 15 and 16 are side elevation and plan, respectively, of a device to produce rosettes.

Figure 17:
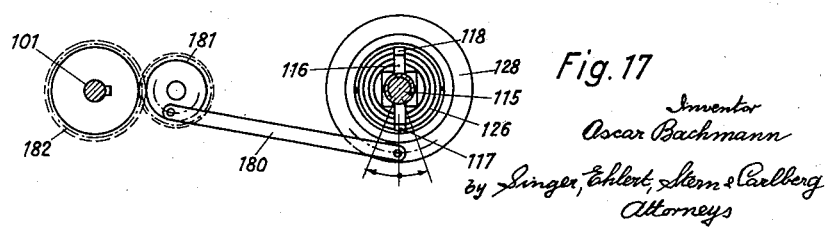

Fig. 17 shows part of the driving gear in a diagrammatic manner.

Figs. 18 to 55 illustrate by example some of the patterns to be produced by the new machine.

Figure 3:
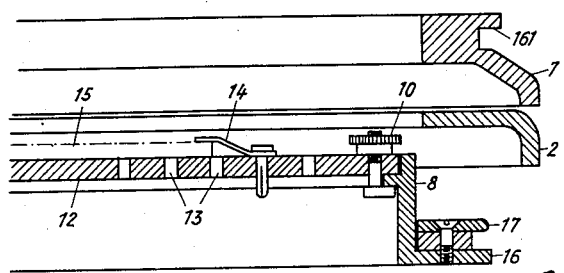

The machine comprises a support carrying a table 1. On the table 1 a slide 2 is mounted; it may be adjusted thereon in the direction of the arrows B, Fig. 2. The slide 2 rests on two parallel ribs 3 with slanting sides on rollers 4 rotatably mounted on studs obliquely mounted on ribs on the table 1. On obliquely mounted studs on the slide 2 rollers 6 are rotatably mounted supporting a cross-slide 7. The latter moves at right angles with reference to the movement of slide 2. Both slides may be moved independently of each other as described later. Below the slide 2 an annular frame 8 is arranged which is keyed on the shaft 9 (Figs. 2, 3, 7 and 8). On the frame 8 a disk 12 is rotatably mounted which may be fixed to the guide 8 by means of a clamping screw bolt with nut 10 (Fig. 3). The disk 12 is provided with rows of holes 13 (Figs. 3 and 7) into each of which may be inserted a springy holder 14 for a plate 15 on which the engravings are to be produced. The plate 15 may consist of metal, glass or any other suitable material covered by a layer of soft material such as wax. The annular frame 8 is provided with a radially projecting flange 16 on which a template 17 is fastened. The template 17 controls the movement of the slide 100, which is shown on Fig. 4.

Figure 11:
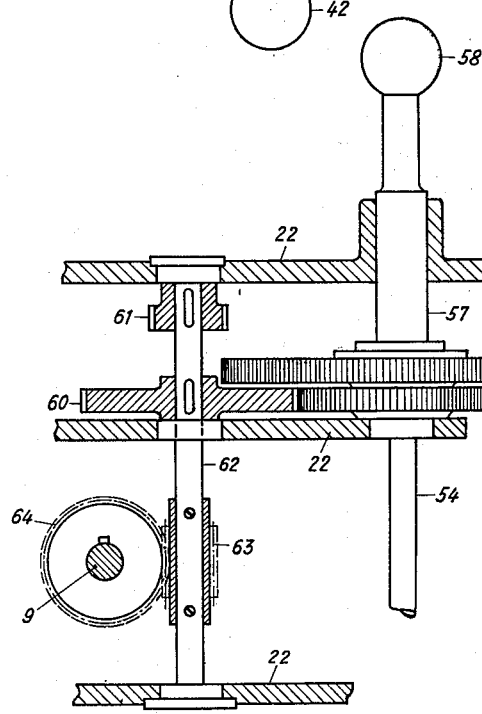

The shaft 9 is driven by a motor 19 (Fig. 1) arranged in the frame G. The motor 19 drives a stepped pulley 21 by a belt 20. The pulley 21 is keyed on a shaft 23 (Fig. 9) rotatably mounted in the walls 22 of a change speed gear casing. A spur wheel 24 on the shaft 23 drives a spur wheel 25 (Figs. 9, 10 and 12) fastened to a hollow shaft 26. On the shaft 26 a second spur wheel 27 is keyed while a set of toothed gears 28 to 36 of different diameters run loosely on said shaft 26. The boss of each gear 28 to 36 is provided with a keyway 38 running in axial direction. In the keyway 38 of each of the spur wheels 28 to 36 a key 39 may be inserted. The key 39 is rockingly mounted in a recess of a shaft 40 slidably mounted in the axial bore of the hollow shaft 26. The key 39 projects through a slot 41 of the shaft 26 and is brought in engagement with the keyway 38 of any of the gears 28 to 36 by a spring according to the axial displacement of the shaft 40. The latter may be displaced by hand by means of a knob 42 (Fig. 10). The gears 28 to 36 (Figs. 10 and 12) drive by means of intermediate gears 43 spur wheels 44 to 52 keyed on a shaft 54. The gears 43 are supported on L-shaped member 43' (Fig. 12). The shaft 54 which is journalled in the walls 22 carries two spur wheels 55, 56 (Fig. 10) rigidly connected with each other and axially displaceable on a key of the shaft 54 by a hollow shaft 57 slidingly mounted on shaft 54. The shaft 57 is slidably mounted in the wall 22 and may be axially displaced by a knob 58 so that the gear 55 may be brought in mesh with the spur wheel 60 or the wheel 56 with the spur wheel 61 (Fig. 11). The wheels 60, 61 are keyed on a common shaft 62 rotatably mounted in the walls 22 of the gear case and carrying a worm 63. The latter is in engagement with a worm wheel 64 (Figs. 11 and 13) fastened on the shaft 9. The shaft 9 which is journalled in the table 1 is provided with a key 65 and with a pinion 66. The annular frame 8 is mounted on the said shaft 9 by means of spokes, which are not shown, and is driven thereby by the key 65.

Figure 1:
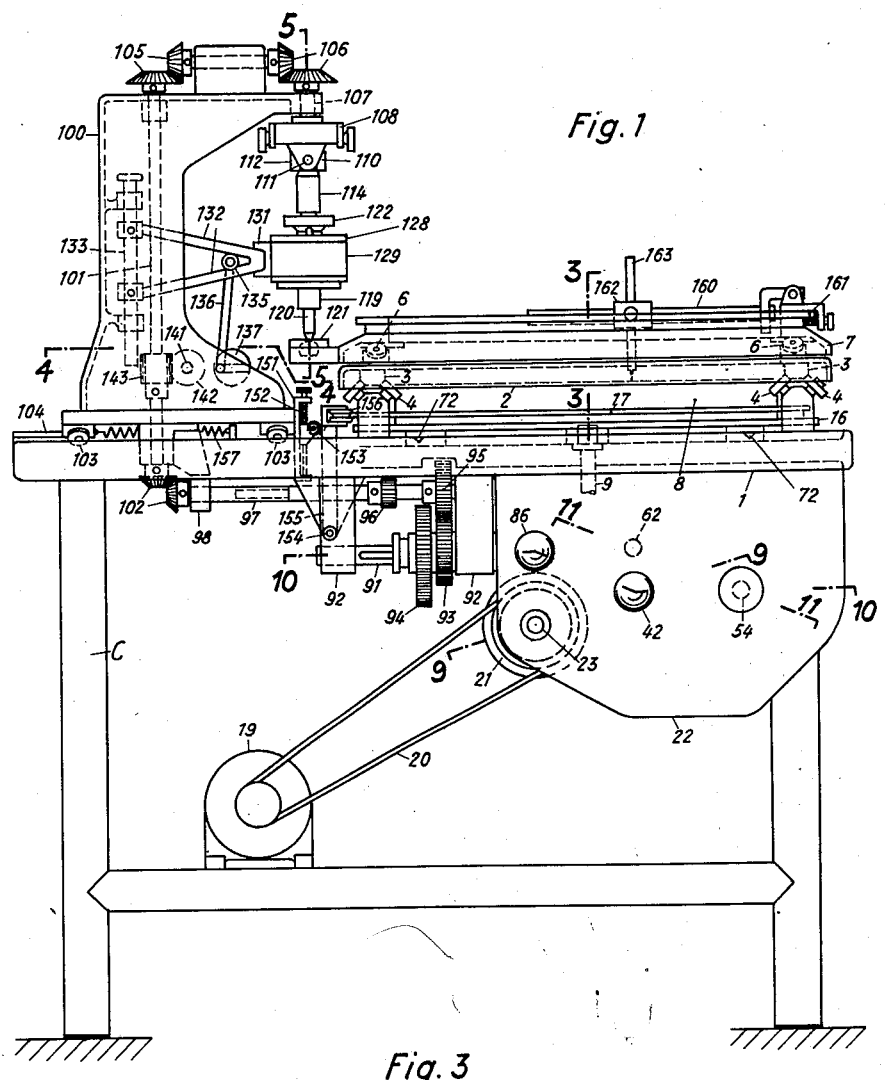
Fig. 1 is a side elevation of the machine.

In place of the annular frame 8 the device shown in Figs. 7 and 8 may be used. This device comprises a carriage 71 running in guideways 72 on the table 1. On the lower side of the carriage 71 a rack 73 is mounted with which the pinion 66 of shaft 9 is in engagement. The rack 73 may be adjusted with reference to the carriage 71 by a set screw 74. On the carriage 71 rests a plate 75 which may be rotated around a stud 76 and which may be arrested in its position by the screw bolts 77. The position of the plate 75 with reference to the carriage 71 may be read off on a scale 78. On the carriage 71 a template 79 is fastened. The template 79 controls the same movements as does the template 17. In the walls 22 another shaft 80 is rotatably mounted (Figs. 10 and 12) on which a pair of spur wheels 81, 82 and two bevel gears 83, 84 are mounted. The spur wheels 81, 82 are rigidly connected with each other; they slide on a key of the shaft 80 and are rotatably connected with a hollow shaft 85, fitted with the knob 86, which is axially movable but not turnable in the wall 22. The other end of the shaft 80 is connected by a catch with a shaft 87, having a knob 88 by which the shaft 87 and therewith the shaft 80 can be axially displaced to bring either of the bevel gears 83, 84 in or out of mesh with the gear 90. The latter is fixed on a shaft 91 running in bearings 92 of the table 1 (Figs. 1 and 10). On the shaft 91 two spur wheels 93, 94 are slidably mounted which may be brought in mesh with spur gears 95, 96 (Fig. 1) respectively mounted on a shaft 97. A lever not shown shifts the wheels 93, 94. The shaft 97 runs in bearings 92, 98 of a support 100. The shaft 97 comprises two parts which are axially displaceable with reference to each other but are connected with each other by a key and turn together.

In the support 100 (Figs. 1, 2 and 4 to 6) a vertical shaft 101 is rotatably mounted. Said shaft 101 is connected by a pair of bevel gears 102 with the shaft 97. The support 100 rests, by means of rollers 103 mounted on inclined studs, on rails 104 on the table 1. The shaft 101 is connected by two pairs of bevel gears 105, 106 and an intermediate shaft with a shaft 107 (Figs. 1, 2, 5 and 6). On the shaft 107 an eccentric chuck 108 is mounted. Said chuck comprises a screw threaded spindle 109 rotatably mounted in bearings of the chuck 108 and provided with a knob at each end for turning said spindle 109 by hand. On the latter a cross-slide 110 is arranged having two studs 111 on which a ring 112 is rotatably mounted. On a cross pin 113 of said ring 112 a sleeve 114 is loosely mounted. Into the sleeve 114 the upper end of a shaft 115 projects, the lower end of which carries a bolt 124. On the bolt 124 and projecting into a slot of shaft 115 a bifurcated piece 116 is arranged having two upwardly projecting prongs 117 and 118. The lower end of the shaft 115 forms a sleeve 119 in which the upper end of a shaft 120 is guided while the lower end is ball-shaped and rests in a bearing 121. The latter is arranged in the cross-slide 7 (Fig. 6). The shaft 115 is provided with a screw threaded part on which a nut 122 is arranged co-operating with the prongs 117, 118. The nut 122 regulates the swinging motion of the piece 116 by allowing more or less play between the lower edge of the nut 122 and the prongs 117 and 118. The piece 116 is rotatably mounted on studs 125 arranged in an annular member 126 rotatably mounted on radially disposed pins 127 of a sleeve 128. The latter is rotatably mounted in an arm 129 in which the sleeve 128 is adjustably mounted and in which it is held in position by a set-screw 130 (Fig. 5). The sleeve 129 is arranged in a bearing 131 by means of a bolt 129a journalled in a bearing 131 supported by arms 132 and rods 133 (Figs. 1 and 4). Between the arms 132 a bearing 135 is arranged in which the upper end of a rod 136 is journalled. The lower end of rod 136 is rotatably mounted in a disk 137 (Fig. 4). The rod 136 is adjustably connected in radial direction with the disk 137 and may be fixed in any radial position. The disk 137 is keyed to a shaft 138 (Fig. 4) carrying a spur wheel 139 meshing with spur wheel 140. On the shaft 141 of the wheel 140 a worm wheel 142 is fastened which may be driven by the worm 143 of the shaft 101 (Figs. 1 and 4).

On the support 100 a frame 151 is fastened in which a screw threaded spindle 152 is mounted. On the spindle 152 a screw threaded bearing for a roller 153 is arranged. The roller 153 bears on a lever 155 rotatably mounted on a pin 154. On the free end of lever 155 a roller 156 is rotatably mounted which is in contact with the template 17 of the annular frame 8. A spring 157 which is secured at one end to table 1 and at its other end to the support 100 urges the support 100 toward the template 17 to bring said roller 156 into engagement with the template 17. As shown in Fig. 4, the roller engages the contoured edge of the template 17 and is moved in accordance with that contour upon rotation of the template 17 to impart movement to the support 100. The part 153 is always in contact with the part 155, and the part 156, which is always in contact with the part 17, is mounted on the part 155. If the support 100 moves, the telescoped parts of shaft 97 slide on each other.

On the slide 7 at least one bar 160 (Figs. 1 and 2) carrying the engraving stylus is arranged. The bar 160 is adjustably mounted on a circular flange 161 provided with a scale. The flange 161 is a part of slide 7. On the bar 160 a sleeve 162 is adjustably mounted carrying the engraving stylus 163. Two or more bars may be mounted on the flange 161 and in place of the bars 160 a rail 165 carrying a number of sleeves each adapted to receive a stylus 163 (shown in broken lines, Fig. 2) may be provided.

As shown in Fig. 14 there may be arranged two rails 168 above the disk 12 of the frame 8 in which a table 169 is slidably mounted. Two parallel rails 170 are attached to table 169 and between the rails a second table 171 is movably mounted. The table 171 is provided with holes 13 in which elements 14 may be located to hold the plate destined to receive the engravings.

As the table 12 rotates in a right hand or left hand direction corresponding to the driving wheels of the gear drive, the plate for the engravings, fastened to the disc 12, rotates together with the disc 12. If one figure is engraved the plate with the engraving has to be shifted by the shifting of the table 171 and the engraving is more or less away from the centre of the disc 12. Another engraving is now produced on the same plate and the two engravings form together a combined figure. A different combined figure is produced if the distance from the centre of the plate is different.

As shown in Figs. 15 and 16 two parallel guide rails 190 are fastened on the disc 12 of the annular frame 8 for the following special purpose. Between the rails 190 a slide 191 is movably mounted. On a pivot 192 of the slide 191 a circular disk 193 is rotatably mounted. The disk 193 is provided with holes 13 adapted to receive the clamps 14 to hold the plate to receive the engravings.

If a second engraving should be combined with the first engraving, the first engraving must be moved a certain distance in relation to the centre of the shaft 9. This is done by the shifting of the slide 191 together with the turning of the disc 193.

As shown in Fig. 17 a connecting rod 180 may be connected at one end to the sleeve 128 (Figs. 5 and 6) while the other end of the rod is attached to a spur wheel 181 driven by a spur wheel 182 on the shaft 101. The shaft 101 when rotated oscillates the sleeve 128 by means of the members 182, 181 and 180.

Figure 9:
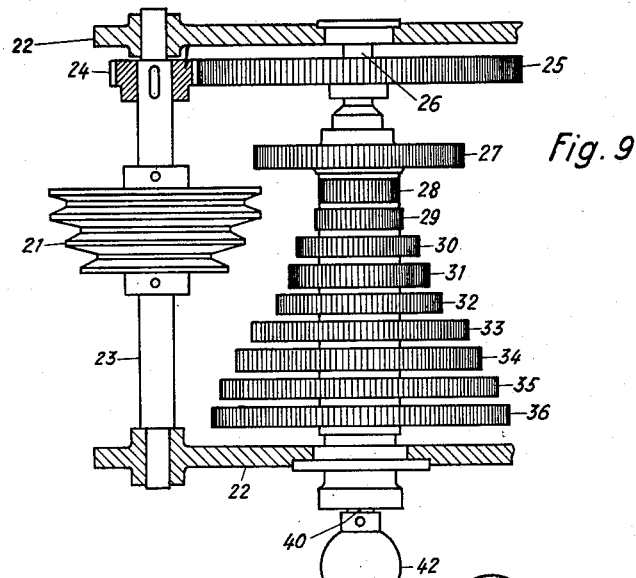
Figs. 9 to 11 are cross-sections taken on the lines 9—9, 10—10 and 11—11, respectively, of Fig. 1.

The device described works as follows:

By switching in the motor 19 the latter drives, by means of the belt driver 20, 21, the shaft 23, and by means of gears 24 and 25, the shaft 26 (Figs. 9 and 12). By the shaft 26 the gear 27 is rotated as well as the gear 28 coupled by the clutch 39 (Figs. 10 and 12). By the intermediate gear 43 and spur wheel 44 on shaft 54 the spur wheels 55, 56 (Figs. 10 and 13) are driven. As shown in Fig. 11 the gear 55 meshes with the gear 60 on the shaft 62 which drives by means of the worm 63 and worm wheel 64 the shaft 9 and therewith the annular frame 8 and the table 12. The gear 25 rotates simultaneously by the spur wheel 81 the shaft 80 (Fig. 10). The latter drives by means of the gears 83, 90 the shaft 91. Either of the gears 93, 94 of shaft 91 is in mesh with one of the gears 95, 96 (Fig. 1). The rotations of the shaft 97 are transmitted by the gears 102, 105, 106 to the shaft 107 operating thereby the adjusting device 108 (Figs. 1, 5 and 6).

In the position of the parts 110, 113 of the cross-joint as shown in Fig. 5 the sleeve 114 will be turned about an axis common to the shaft 107 and said sleeve 114. The rotation is not transmitted to the shaft 115. If however by turning the screw-threaded spindle 109 the slide 110 is brought out of center it will perform a circular movement about the axis of shaft 107. The shaft 115 sliding in sleeve 114 transmits the gyratory movement, as it is held in the universal joint 124 to 127. The lower end of the member 116 rockingly mounted on the bolt 124 performs but an oscillatory movement in the direction of the arrow C (Fig. 6) moving the frame 7 to and fro in the directions shown by the arrow A (Fig. 2). By this movement of frame 7 the stylus 163 will cut a sine curve (Fig. 18) on the wax of the glass plate 15 fastened to the disk 12.

Figure 18:
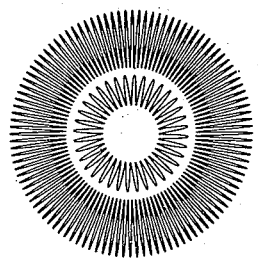
Figure 19:
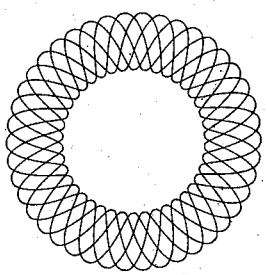

By shifting the shaft 40 (Fig. 10) the key 39 may be brought in engagement with any of the spur wheels 28 to 36 and as the rotations thereof are transmitted to the gears 44 to 52 the circumferential speed of disk 12 may be varied within wide limits and therewith the number of the periods of the sine curve during a working period. In Fig. 18 the curves formed are shown. The outer ring comprises a plurality of the periodic curves formed as a predetermined multiple of the periodic curves shown in the inner ring for each full turn of disk 12. If the speed of the disc 12 is changed there are cut more or less curves on the plate 15. The lower the speed of the disc 12 the more curves are cut on the plate 15. Each curve is produced by the movement of the frames 2 and 7. By pulling knob 58 (Figs. 10 and 11) outwardly, the gears 56, 61 are brought in engagement. The number of teeth on the wheels 56, 61 are such that the sinusoidal curve will have been finished only after five full turns of the disk 12. The engraving shown in Fig. 19 is thereby produced by the stylus 163 on the wax layer of disk 12. By choosing appropriate co-operating gears 56, 61 and so on the number of turns of disk 12 are determined. The diameter of the circle performed by sleeve 114 is adjusted according to the distance of the slide 110 from the axis of shaft 107 and therefore the direction C (Fig. 6) of the shaft 120 and the direction A of the frame 7 will be different as well as the height of the curves.

Figure 20:
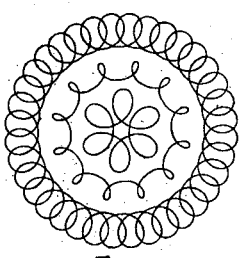
Figure 21:
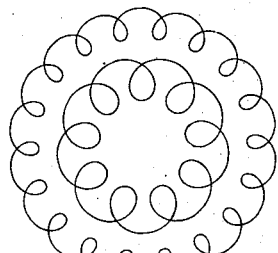
Figure 22:
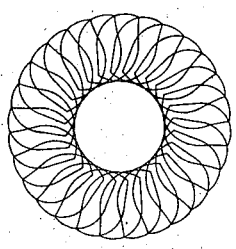
Figure 23:
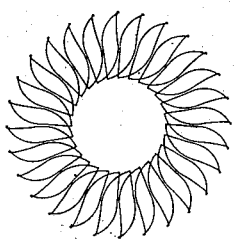
Figure 24:
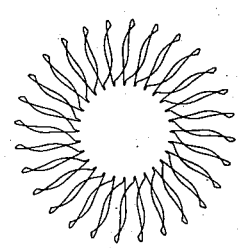
Figure 25:
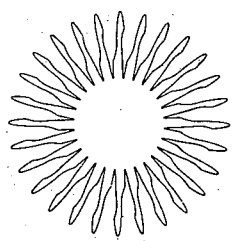

If however the nut 122 is screwed down until the seat 122a comes to bear on the arms 117, 118 the parts 115, 116, are coupled. The gyratory movement of the sleeve 114 will be transmitted to sleeve 119, shaft 120 and to slide 7. The latter can only perform a reciprocating movement in the direction shown by arrow A (Fig. 2), the annular guide 2 carrying the frame 7 is forced to move in the direction shown by arrow B. The frames 2, 7 are moving at right angles with reference to each and the stylus 163 would draw a circle if the disk 12 were stationary. The disk 12 however is turning and the stylus 163 draws loops as shown in Fig. 20. By moving the knob 88 (Fig. 10) and therewith the shaft 80 until the bevel gear 84 meshes with bevel gear 90, the direction of the rotation of the shafts 91, 97 of the swivel joint 108 and of the shaft 120 is reversed. The stylus 167 will now draw loops as shown in Fig. 21. By shifting the gears 81, 82 from the position shown in Fig. 10 in such a manner as to get the gear 82 into mesh with the gear 27 the rotational speed of the shaft 80, 91, 97 and 101 will be reduced and the movements of the frames 2, 7 will be slowed. Figures 20, 21 illustrate the effects obtained, that is, a different number of loops will be produced for each full turn of the disk 12.

Figure 26:
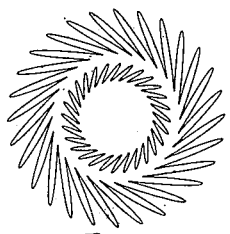

By loosening the nut 122 until there is a gap between the edge 122a of the nut 122, and the arms 117 and 118 which is less than that shown in Figs. 5 and 6 the edge 122a will make contact alternately with the arms 117, 118 while the fork 115 is rotating. The member 116 makes at each rotation a rocking motion about its pivot 124. The curve drawn by the stylus 165 which may be a sine curve or loop-like curve receives a certain break. By further loosening the nut 122 the curves shown in Figs. 22 to 25 may be produced. The curves shown in Fig. 25 will be produced only if the edge 122a touches the arms 117, 118 but slightly and for a very short time upon each rotation of shaft 107. By loosening the screw 130 (Fig. 5) the sleeve 128 may be turned in the holder 129 in both directions from its middle position shown. Owing to the displacement of the parts 115, 116 in the sleeve 128 the frames 2, 7 will be moved in such a manner that the curves or loops drawn by the stylus 165 will take an oblique position with reference to the center of the figure, as shown in Fig. 26.

Figure 27:
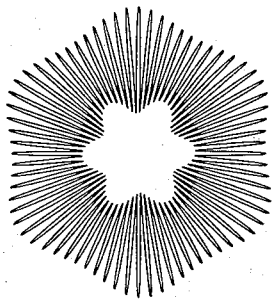
Figure 28:
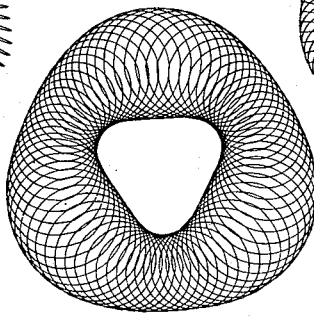
Figure 29:
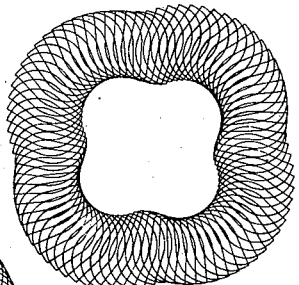
Figure 30:
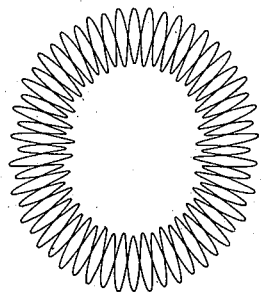
Figure 31:
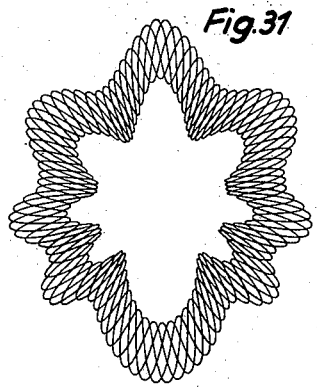

While the slide 110 remains in its radial position, the radial length of a curve produced remains stationary. During a full turn of disk 12 the length may be varied and drawings as shown in Figs. 27 and 28 may be produced in the following manner:

The worm 143 (Figs. 1 and 4) on shaft 101 drives by the gears 142, 140, 139 the disk 137 with which the connecting rod 136 is connected. While the disk 137 is rotating the connecting rod 136 performs an up and down movement, the latter being transmitted over the members 135, 131 and 129 to the sleeve 128. The bolt 124 (Figs. 5 and 6) is moved up and down and the leverage between sleeve 114 and the member 120 and therewith the height of the curves drawn varies. The number of changes in the dimensions of a curve during a full turn of the disk 12 may be varied by choosing gears 139, 140 of different diameters and by adjusting the position of the member 39 (Fig. 10). Moreover the variation in height of a curve may be varied by radially displacing the pin by which the connecting rod 136 is connected with disk 137.

The support 100 which is movably mounted by rollers 103 on the rails 104 is drawn to the right (Fig. 1) by a spring 157. The roller 153 is pushed on to lever 155 which rests by roller 156 on the template 17. In Fig. 4 but one of many possible shapes of the cam 17 is shown. The support 100 and therewith the frame 7 is moved in the direction of arrow A by said template 17 and curves as shown for instance in the Figs. 29 and 31 may be produced. By displacing the roller 153 by means of the spindle 152 the shape of the curves produced may be varied.

Figure 32:
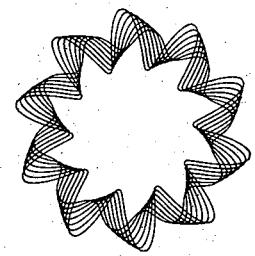

The stylus 163 may be placed on any point of the plate 15 by adjusting the holder 160 in the guide 161. The shape of the curves produced by the stylus 163 will be different according to the position where the stylus 163 is placed on the plate 15. A plurality of styli 163 may be used, each tracing in a different position and each stylus will trace a different curve. By displacing the plate 15 fitted to the disc 12 with reference to the frame 8 parts of the curves may be displaced with reference to other parts and patterns as shown in Fig. 32 may be produced. By a scale this displacement may be read off.

Figure 33:
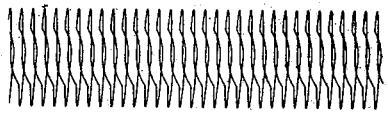
Figure 34:
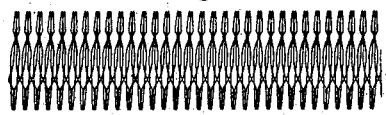
Figure 35:
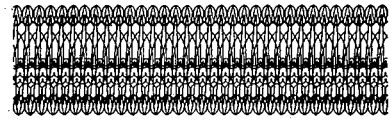
Figure 36:
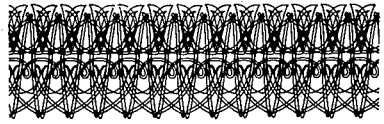
Figure 37:
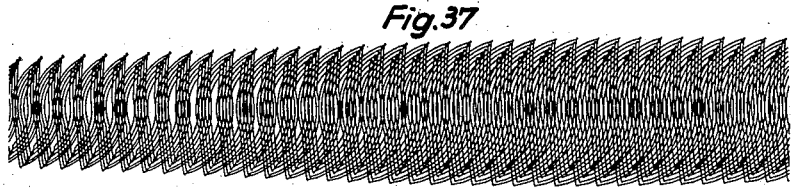
Figure 38:
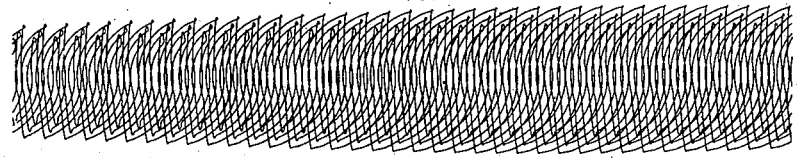
Figure 39:
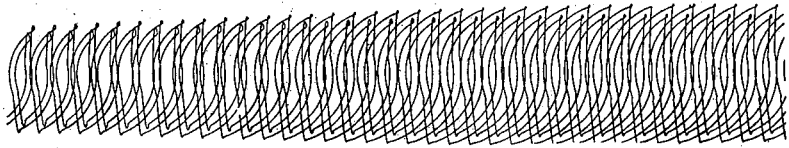
Figure 50:
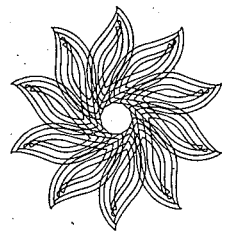
Figure 53:
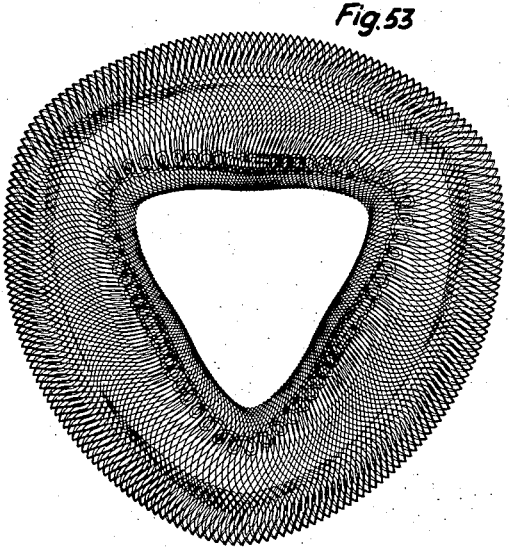
Figure 51:
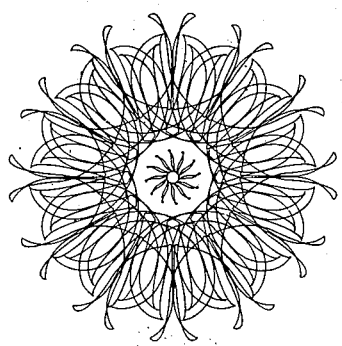
Figure 54:
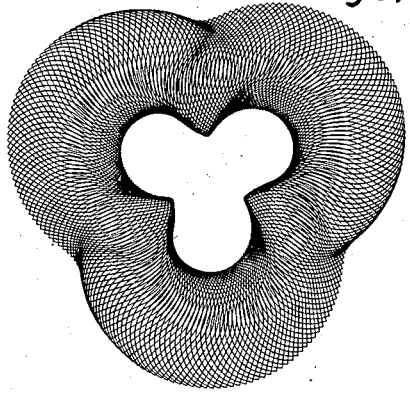
Figure 52:
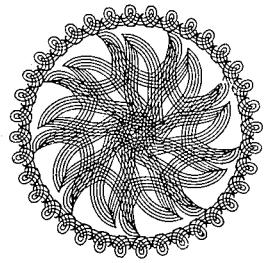
Figure 55:
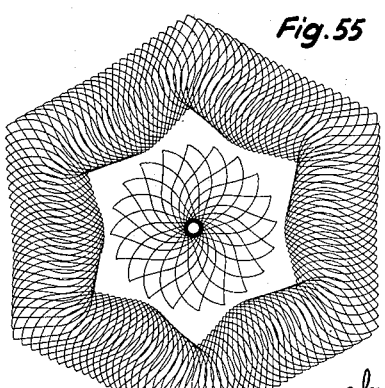

By making use of the device shown in Figs. 7 and 8 the curves shown in the Figs. 33 to 47 may be traced. To produce different patterns the slide 71 is displaced on the rack 73 by means of the shaft 9. The stylus 163 traces partly a straight line as shown in Figs. 33 to 44. To trace a pattern as shown in Fig. 33 for instance the elements 110 to 114 of the chuck 108 shown in Figs. 5 and 6 are re-set and the member 122 is screwed down on the shaft 115. By pushing the knob 88 out of its position as shown in Fig. 10 into its other end position, the direction of rotation of the members 90 to 120 is reversed and the mirror image of the pattern of Fig. 33 will be traced. The said two patterns placed one above the other would produce the pattern shown in Fig. 34. In an analogous manner the pattern shown in Figs. 35 and 36 may be produced in which figures several different patterns are reproduced placed one above another. In Fig. 37 a pattern is shown which is produced by superposing or combining the patterns shown in the Figs. 38 and 39. The patterns in the said Figs. 38 and 39 are traced by means of a holder 165 for a plurality of styli 163 (Fig. 2). The patterns shown in Figs. 38 and 39 are produced by the use of three and two styli. In Figs. 40 and 41 two patterns are shown in which curves are superposed and engraved and which may be reproduced with good results by any two-color printing process.

The use of the members 137 to 143 (Fig. 4) has the effect of a regular change in the height of the curves as shown in Figs. 42 and 43. An oblique displacement of the curves shown in Fig. 42 to that shown in Fig. 43 may be effected by turning the sleeve 128 in the member 129 (Figs. 5 and 6). In Fig. 44 a pattern is shown which has been produced by setting the members for tracing the design in Fig. 42 but by increasing the rate of movement of the table 71.

If the rack 73 is displaced with reference to the slide 71 by means of the screw 74, the lines of the pattern are displaced similarly to the pattern in Fig. 32. By turning the table 75 (Fig. 7) about its pivot 76, patterns as illustrated in the Figs. 45 and 46 will be produced. By simultaneously using a template 79 no straight basic lines will be produced but wave lines instead in conformity with the shape of the template.

In Fig. 47 a pattern is shown in which the directions of the lines and their angular position will, by reference to a center line, vary in a regular manner. The varying of the length of each element of the pattern may be obtained by the means described with reference to Fig. 42 and the angular variation of the lines is obtained by the device shown particularly in Fig. 17 by turning the sleeve 128 to and fro in a regular manner.

Fig. 48 is an example of a pattern which may be produced when the modified support of Fig. 14 is used. Fig. 49 is an example of a pattern which may be produced when the modified support of Figs. 16 and 17 is used. Figs. 50–55 represent other types of combined patterns which can be produced by appropriate adjustments of the machine.

What I wish to secure by United States Letters Patent is:

1. An engraving machine comprising a support including a rotatable and adjustable disc to receive a plate to be engraved, a slide, at least one stylus operatively mounted on said slide to work on said plate, means for moving said support and said stylus with respect to each other to trace figures on said plate, the aforesaid means including means for distorting the curves of the figures at predetermined places and to predetermined extents, said last mentioned means including a tiltably mounted shaft, means for moving said shaft in a circular path, a nut adjustably mounted on said shaft, a bifurcated member operatively associated with said shaft and said nut, a universal joint supporting said bifurcated member for movement in every direction, said bifurcated member having two arms cooperating with said nut to be moved thereby upon movement of said shaft in a circular path, an axially displaceable member operatively connecting said bifurcated member and said slide to transmit the movement of said member to said slide to move said slide and said stylus with respect to said support, and means for rotating said disc including change speed gearing.

2. An engraving machine comprising a support including a rotatable and adjustable disc to receive a plate to be engraved, a slide, a guide mounted on said slide, a holder adjustably attached to said guide, at least one stylus carried by said holder to work on said plate, means for moving said support and said slide with respect to each other to trace figures on said plate, the aforesaid means including means for distorting the curves of the figures at predetermined places and to predetermined extents, said last mentioned means including a tiltably mounted shaft, means for moving said shaft in a circular path, a nut adjustably mounted on said shaft, a bifurcated member operatively associated with said shaft and said nut, a universal joint supporting said bifurcated member for movement in any direction, said bifurcated member having two arms cooperating with said nut to be moved thereby upon movement of said shaft in a circular path, an axially displaceable member operatively connecting said bifurcated member and said slide to transmit the movement of said member to said slide to move said slide with respect to said support, said means for moving said shaft in a circular path including an adjustable eccentric chuck, and means for rotating said chuck, said shaft being connected to said chuck with freedom of movement in every direction, said nut being adjustable on said shaft so as to vary the amount of operative association between said nut and said bifurcated member so that said nut is capable of transmitting the whole or part of the whole movement of the shaft to said bifurcated member and thusly to said slide, and means for rotating said disc including change speed gearing.

OSCAR BACHMANN.

REFERENCES CITED

The following references are of record in the file of this patent:

UNITED STATES PATENTS

| Number | Name | Date |
| --- | --- | --- |
| 1,254,003 | Stainkamp | Jan. 15, 1918 |
| 1,269,920 | Foster | June 18, 1918 |
| 1,294,639 | Eaton | Feb. 18, 1919 |
| 1,420,319 | Kelley | June 20, 1922 |
| 1,763,885 | Fisher | June 17, 1930 |

FOREIGN PATENTS

| Number | Country | Date |
| --- | --- | --- |
| 271,959 | Switzerland | Nov., 1950 |
| 300,918 | Germany | Sept. 29, 1917 |